US008626617B1

(12) United States Patent
Bhatt

(10) Patent No.: US 8,626,617 B1
(45) Date of Patent: Jan. 7, 2014

(54) METHOD AND SYSTEM FOR IDENTIFYING FIXED ASSET TRANSACTIONS FROM MULTIPLE FINANCIAL TRANSACTIONS

(75) Inventor: Patanjali Bhatt, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 260 days.

(21) Appl. No.: 12/913,677

(22) Filed: Oct. 27, 2010

(51) Int. Cl.
*G07B 17/00* (2006.01)

(52) U.S. Cl.
USPC .......................................... 705/30; 395/236

(58) Field of Classification Search
USPC ......................................................... 705/30
See application file for complete search history.

(56) References Cited

U.S. PATENT DOCUMENTS

| 5,689,650 | A  | * | 11/1997 | McClelland et al. | ....... | 705/36 R |
| 7,640,179 | B1 | * | 12/2009 | Sachedina | .................... | 705/7.31 |
| 7,788,146 | B2 | * | 8/2010 | McCarthy, Jr. | .................. | 705/35 |
| 8,204,809 | B1 | * | 6/2012 | Wise | ................................ | 705/35 |
| 2008/0120129 | A1 | * | 5/2008 | Seubert et al. | ..................... | 705/1 |
| 2009/0248564 | A1 | * | 10/2009 | Fallon et al. | .................... | 705/37 |

* cited by examiner

*Primary Examiner* — Garcia Ade
(74) *Attorney, Agent, or Firm* — Osha Liang LLP

(57) ABSTRACT

A method for identifying fixed asset transactions in multiple financial transactions. The method includes obtaining financial transaction records describing the multiple financial transactions and generating an unverified fixed asset transaction list. Generating the unverified fixed asset transaction list includes, for each financial transaction record, determining whether the financial transaction record conforms to at least one asset identification rule. Each asset identification rule corresponds to a confidence level of the asset identification rule. When the financial transaction record conforms to the at least one asset identification rule, generating the unverified fixed asset list further includes generating a confidence level of the financial transaction record based on the confidence level of the at least one asset identification rule, and inserting the financial transaction record and the confidence level of the financial transaction record in the unverified fixed asset transaction list.

29 Claims, 14 Drawing Sheets

Verified Fixed Asset List
300

| Identifier | Fixed Asset Description | Amount | Payee | Date | Account # | Bank | Funds Check # | Funds Clear Date | Memo | Other | Depreciation Model | Current Year Depreciation | Current Year Tax Deduction |
|---|---|---|---|---|---|---|---|---|---|---|---|---|---|
| 7592349 | High Performance Server | $100,000 | Super Fast Networks Company | 8/19/2010 | 57290356 | Lucullan Bank | n/a | 8/20/2010 | n/a | warranty link | Straight Line | $10,000 | $10,000 |
| 4521760 | Commercial Real Estate | $5,500,000 | Real Estate Property Company | 6/15/2010 | 978243 | Financial Institution A | 356 | 6/18/2010 | office building included | 0 | Declining Balance | $1,100,000 | $1,100,000 |
| 89731 | Semiconductor Fabrication Machine | $10,000,000 | Fabrication Technology Limited | 9/1/2010 | 87076659 | Financial Institution B | 0 | 9/1/2010 | bundle A | service agreement | Straight Line | $1,000,000 | $1,000,000 |
| 13485692 | Exotic Sports Car | $300,000 | Alacritous Cars LLC | 10/5/2010 | 2335589 | Brobdingnag Bank | 573 | 10/6/2010 | supercharged package | signing documents link | Custom | $150,000 | $135,000 |

320 Fixed Asset List Entries

FIG. 3

VERIFIED FIXED ASSET REPORT CONTINUED 401
Straight Line Depreciation
| Year | FA Book Value at Beginning of Year | Depreciation Expense | Accumulated Depreciation | FA Book Value at End of Year |
|---|---|---|---|---|
| 1 | $100,000 | $10,000 | $10,000 | $90,000 |
| 2 | $90,000 | $10,000 | $20,000 | $80,000 |
| 3 | $80,000 | $10,000 | $30,000 | $70,000 |
| 4 | $70,000 | $10,000 | $40,000 | $60,000 |
| 5 | $60,000 | $10,000 | $50,000 | $50,000 |
| 6 | $50,000 | $10,000 | $60,000 | $40,000 |
| 7 | $40,000 | $10,000 | $70,000 | $30,000 |
| 8 | $30,000 | $10,000 | $80,000 | $20,000 |
| 9 | $20,000 | $10,000 | $90,000 | $10,000 |
| 10 | $10,000 | $0 | $90,000 | $10,000 |
430 DEPRECIATION CALCULATIONS A
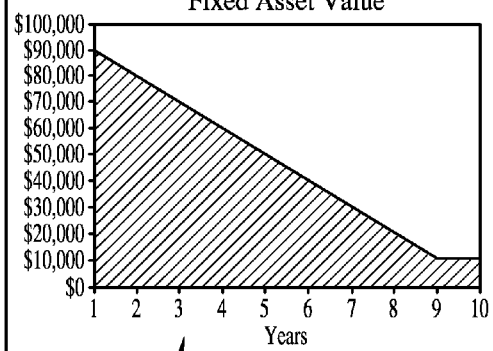
432 DEPRECIATION GRAPH A
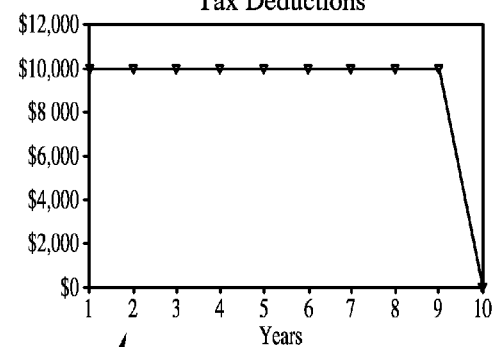
434 TAX DEDUCTION GRAPH A
FIG.4B VERIFIED FIXED ASSET REPORT CONTINUED 402
| | Declining Balance Depreciation | | | | |
|---|---|---|---|---|---|
| Year | FA Book Value at Beginning of Year | Depreciation Rate | Depreciation Expense | Accumulated Depreciation | FA Book Value at End of Year |
| 1 | $100,000 | 23% | $23,000 | $23,000 | $77,000 |
| 2 | $77,000 | 23% | $17,710 | $40,710 | $59,290 |
| 3 | $59,290 | 23% | $13,637 | $54,347 | $45,653 |
| 4 | $45,653 | 23% | $10,500 | $64,847 | $35,153 |
| 5 | $35,153 | 23% | $8,085 | $72,932 | $27,068 |
| 6 | $27,068 | 23% | $6,226 | $79,158 | $20,842 |
| 7 | $20,842 | 23% | $4,794 | $83,951 | $16,049 |
| 8 | $16,049 | 23% | $3.691 | $87,643 | $12,357 |
| 9 | $12,357 | 19% | $2,357 | $90,000 | $10,000 |
| 10 | $10,000 | 0% | $0 | $90,000 | $10,000 |
431 DEPRECIATION CALCULATIONS B
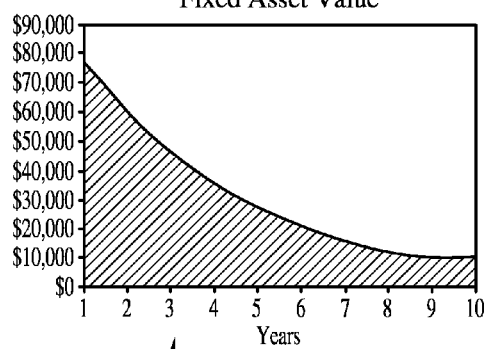
433 DEPRECIATION GRAPH B
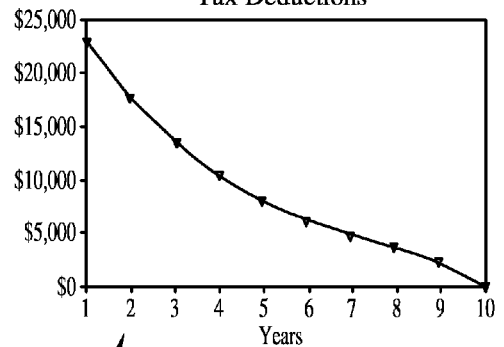
435 TAX DEDUCTION GRAPH B
FIG.4C 520 Payee/Vendor Listing

| Payee/Vendor Name | Fixed Asset |
|---|---|
| Tom's Building Supplies | Drilling Machine |
| Tom's Building Supplies | Chainsaw |
| Cupertino Lathe Company | Lathe |
| IdriveAuto | Truck |

FIG. 5C

521 Fixed Asset Dictionary

| Code | Item Name | Description |
|---|---|---|
| 300 | Computer | Xmanufacturer, 4GZ, 3MB Ram, 600 GB Hard Drive |
| 500 | Lathe | 30 to 6000 RPM, Dual Bearing |
| 800 | Milling Machine | Horizontal Computer Aided, 46 Guage |
| 1200 | Pickup Truck | Ymanufacturer, 300 HP, 4DR |

FIG. 5D

METHOD AND SYSTEM FOR IDENTIFYING FIXED ASSET TRANSACTIONS FROM MULTIPLE FINANCIAL TRANSACTIONS

BACKGROUND

Accounting is the systematic recording, maintaining, reporting, and analyzing of business transactions. Specifically, accounting allows business entities to use a historical record of the business transactions in order to file tax returns and other documents with a governmental entity, update records for shareholders, and to predict and optimize future transactions.

One aspect of accounting is to record the assets and liabilities of the business entity. In general, an asset is a tangible or intangible resource that is used by an owner. For example, an asset may be a computer, an office supply, manufacturing equipment, a display case, furniture, patent, or any other resource. The useful life of the asset is the predefined duration of time in which the asset is deemed capable of being used by the owner. The duration of time may account for usage, wear and tear on the asset, outdating or obsolescence of the asset, decay, or other factors that deplete the value of the asset to the business.

During the useful life of the asset, the owner depreciates the purchase price of the asset. Specifically, the owner may claim, as an expense, a portion of the purchase of the asset at each year during the useful life of the asset. Thus, at the end of the useful life, the owner has claimed, in total, only and the entire purchase price of the asset. By claiming the portion of the purchase price as an expense, the owner may reduce their income by the amount depreciated.

SUMMARY

In general, in one aspect, the invention relates to a method for identifying fixed asset transactions in multiple financial transactions. The method includes obtaining financial transaction records describing the multiple financial transactions, and generating an unverified fixed asset transaction list. Generating the unverified fixed asset transaction list includes, for each financial transaction record, determining whether the financial transaction record conforms to at least one asset identification rule. Each asset identification rule corresponds to a confidence level of the asset identification rule. When the financial transaction record conforms to the at least one asset identification rule, generating the unverified fixed asset list further includes generating a confidence level of the financial transaction record based on the confidence level of the at least one asset identification rule, and inserting the financial transaction record and the confidence level of the financial transaction record in the unverified fixed asset transaction list.

In general, in one aspect, the invention relates to a system for identifying fixed asset transactions in multiple financial transactions. The system includes a computer processor, a data repository that includes financial transaction records describing the financial transactions, and a fixed asset application. The fixed asset application includes a rules engine, where the rules engine includes functionality to generate an unverified fixed asset transaction list. Generating the unverified fixed asset transaction list includes, for each financial transaction record, determining whether the financial transaction record conforms to at least one asset identification rule. Each asset identification rule corresponds to a confidence level of the asset identification rule. When the financial transaction record conforms to the at least one asset identification rule, generating the unverified fixed asset list further includes generating a confidence level of the financial transaction record based on the confidence level of the at least one asset identification rule, and inserting the financial transaction record and the confidence level of the financial transaction record in the unverified fixed asset transaction list.

In general, in one aspect, the invention relates to a computer readable storage device that includes computer readable program code embodied therein for performing a method for identifying fixed asset transactions in multiple financial transactions. The method includes obtaining financial transaction records describing the multiple financial transactions, and generating an unverified fixed asset transaction list. Generating the unverified fixed asset transaction list includes, for each financial transaction record, determining whether the financial transaction record conforms to at least one asset identification rule. Each asset identification rule corresponds to a confidence level of the asset identification rule. When the financial transaction record conforms to the at least one asset identification rule, generating the unverified fixed asset list further includes generating a confidence level of the financial transaction record based on the confidence level of the at least one asset identification rule, and inserting the financial transaction record and the confidence level of the financial transaction record in the unverified fixed asset transaction list.

Other aspects of the invention will be apparent from the following description and the appended claims.

BRIEF DESCRIPTION OF DRAWINGS

FIGS. 3-5E show examples in accordance with one or more embodiments of the invention.

DETAILED DESCRIPTION

Figure 1:
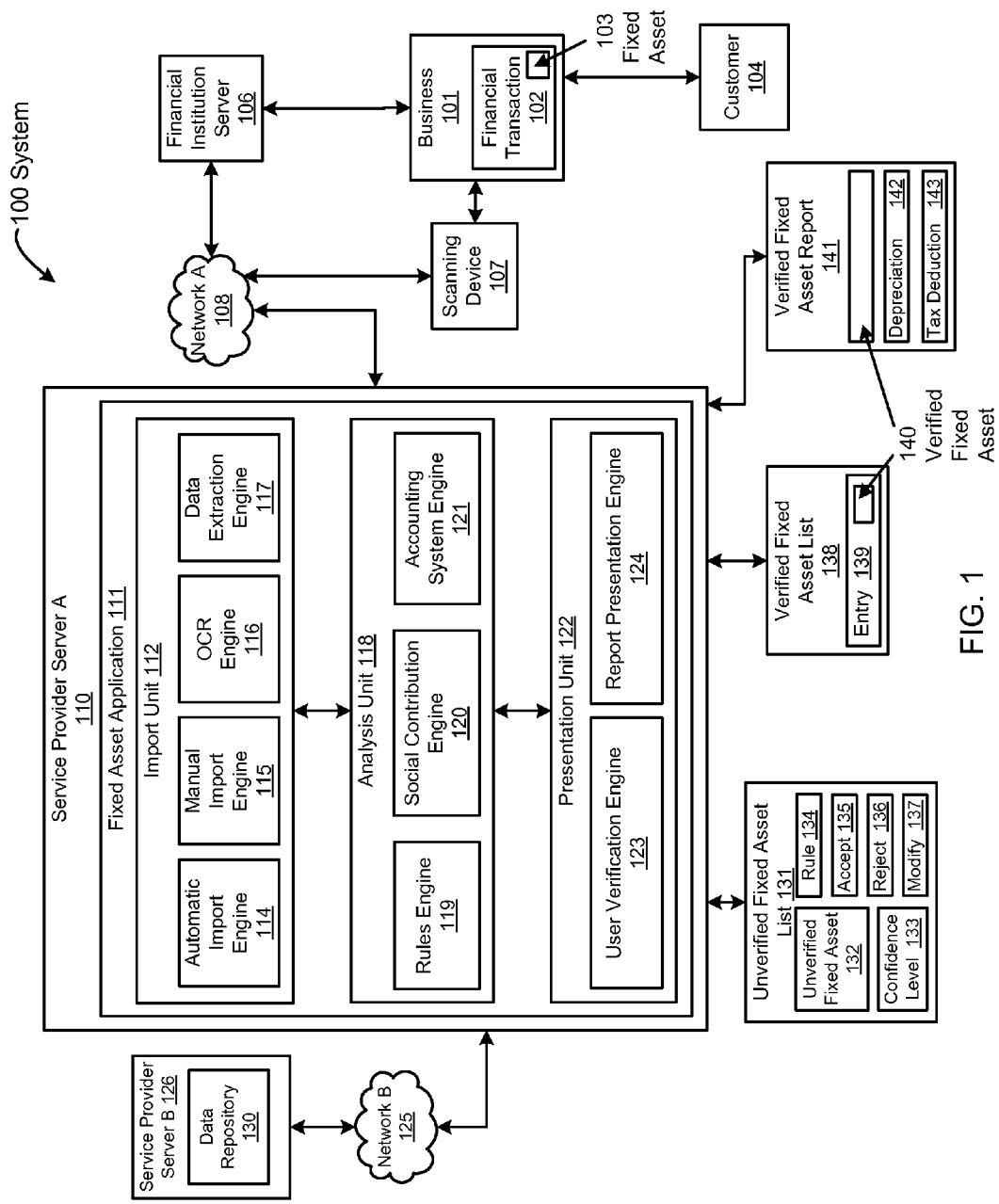
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for identifying the fixed asset transactions from the financial transactions performed by a business. Specifically, embodiments of the invention obtain information about financial transactions from financial transaction reports. Based on the information, embodiments of the invention identify the financial transactions that relate to the purchase or sell of fixed assets using one or more rules. Thus, the owner of the fixed asset may depreciate the fixed asset.

FIG. 1 shows system (100) in accordance with one or more embodiments of the invention. As shown in FIG. 1, system (100) includes components such as business (101), customer (104), financial institution server (106), scanning device (107), service provider server A (110), and service provider server B (126). Each of these components is described below.

In one or more embodiments of the invention, business (101) is any type of business entity that includes functionality to perform financial transactions. For example, the business may include functionality to perform financial transactions with one or more customers (104) of the business (101). For example, the financial transaction may be the selling of a good or service. The term, sell, as used herein may include donate without departing from the scope of the invention. Similarly, the business may include functionality to perform financial transactions with other businesses. For example, the financial transactions with other businesses may include the purchase of raw materials, services, and other goods or services that are used by the business.

Some of the financial transactions may be fixed asset transactions. A fixed asset transaction is the purchasing or selling of fixed assets (103). A fixed asset (103) is a tangible or intangible resource that is used by the business (101) and may be depreciated. Specifically, a fixed asset (103) is any type of depreciable property. For example, the fixed asset (103) may correspond to a computer, an office supply, manufacturing equipment, a display case, furniture, a patent, or any other resource.

In one or more embodiments of the invention, scanning device (107) is used by business (101) to generate a scanned electronic image of a financial document (discussed below). Specifically, scanning device (107) is used to provide the fixed asset application (111) (discussed below) with the electronic image. For example, the scanning device (107) may be a scanner, a printer with scanning functionality, a multifunction device with scanning functionality, or any other suitable device that includes functionality to scan documents. In one or more embodiments of the invention, providing the fixed asset application (111) with the electronic image may include, for example, sending the electronic image to a local computing device (not shown) of the business (101), where the local computing device uploads or opens the electronic image in the fixed asset application (111). Alternatively or additionally, the scanning device (107) may include functionality to upload the electronic image directly into the fixed asset application (111) via network A (108).

For example, if business (101) purchases furniture from a supplier, and used a check as a means of payment for the inventory, then business (101) may use scanning device (101) to scan the details of the check into scanning engine (107) of fixed asset application (111). The details of the check may be scanned by scanning the original check or a copy of the check.

Continuing with FIG. 1, in one or more embodiments of the invention, financial institution server (106) is a computing device configured to process financial transactions and methods of payment (e.g., checks, automatic clearing house (ACH) payments, line of credit payments, credit/debit card payments, etc.). A financial institution is a business that provides financial products and/or services to clients (e.g., a bank, a credit card company, or any other supplier of financial products/services). For example, financial institution server (106) may receive an indication (e.g., by request for payment, or by notification from the payor bank) that a check has been cashed by the payee of the check at a financial institution. If the financial institution server (106) is for the payor bank, the financial institution server (106) may transmit funds equal to the amount of the check to the bank account of the payee at the payee's financial institution and debit the business's account at the financial institution. The financial institution server (106) may receive such transactions from businesses, suppliers, customers, as well as other financial institutions. In one or more embodiments of the invention, financial institution server (106) and/or the data stored on financial institution server (106) may be owned, managed, and/or operated by a financial institution.

The business (101) and the financial institution server (106) may include functionality to generate financial transaction records. A financial transaction record is stored transaction information about a particular financial transaction. Specifically, the financial transaction records include stored attributes about financial transactions performed with the business. For example, in one or more embodiments of the invention, the attributes in the financial record may include one or more of the following: the date of the transaction, information about each item transacted (e.g., make, model, price, or other information) in the financial transaction, total amount of the transaction, whether the transaction was a purchase or a sell, description, information about with whom the transaction is performed (e.g., name of the other business, category of goods or services transacted by the other business, customer information), the financial account of the business (101) used to perform the financial transaction, a memo storing a descriptor or code describing the financial transaction, and any other information.

Financial records may be maintained in financial documents, such as financial reports, receipts, canceled checks, etc. For example, a financial report may be a statement of financial transactions performed in the time period covered by the statement. Alternatively or additionally, the financial report may include financial information processed from financial records. For example, the financial report may present total amount transacted for financial transactions grouped according to particular attribute values (e.g., financial transactions grouped according to category of the business transacted with, financial transactions grouped according to amount transacted, financial transactions grouped according to financial account of the business (101) used in the transaction, and grouped according to one or more other attributes).

In one or more embodiments of the invention, the scanning device (107), business (101), and financial institution server (106) may be operatively connected to service provider server A (110) via network A (108). In general, a network, such as network A (108) and network B (125), is any type of interconnection of devices. For example, the network (e.g., network A (108), network B (125)) may correspond to a local area network (LAN), a wide area network (WAN) such as the Internet, or any other type of network or combination thereof. Further, network A (108) and network B (125) may be the same network or different networks. For example, network A (108) may be a public network while network B (125) is a private network.

Continuing with FIG. 1, service provider server A (110) is any type of computing device that includes functionality to host a fixed asset application (111). Specifically, service provider server A (110) may include functionality to execute instructions of the fixed asset application (111). Fixed asset application (111) is a software application that includes functionality to identify fixed asset transactions. Fixed asset application (111) may include additional functionality not shown or discussed below. For example, fixed asset application may correspond to a complete financial application that includes functionality to generate tax returns, Generally Accepted Accounting Principles (GAAP) reports, inventory management, employee management, and/or other tasks related or unrelated to the identification of fixed asset transactions.

Fixed asset application (111) may receive input from various sources, including businesses and financial institution servers. Fixed asset application (111) may be operatively connected to data repository (130) via network B (125). Specifically, fixed asset application may include functionality to store and/or access data in/from data repositories, such as data repository (130). Service provider server A (110), fixed asset application (111), and other data stored on service provider server A (110) may be owned and/or operated by a service provider (e.g. the owner, developer, and/or manager of the fixed asset application).

In one or more embodiments of the invention, the fixed asset application (111) includes an import unit (112), analysis unit (118), and a presentation unit (122). Each of these components is discussed below.

In one or more embodiments of the invention, the import unit (112) includes components for importing financial documents into the financial asset application (111). For example, the import unit (112) may include functionality to obtain the financial documents from the business (101), the scanning device (107), and/or the financial institution servers (106). The import unit (112) may include an automatic import engine (114), a manual import engine (115), an optical character recognition (OCR) engine (116), and a data extraction engine (117).

The automatic import engine (114) may include functionality to automatically obtain the financial documents from the business (101) and from the financial institution server (106) in accordance with one or more embodiments of the invention. For example, the automatic import engine may include functionality to obtain and store financial institution account credentials (e.g., username, password, personal identification number, and other credentials) of the business's financial account(s) from the business (101). Using the financial institution account credentials, the automatic import engine (114) may include functionality to access the financial account of the business at the financial institution server and request one or more files having the business's financial documents. In one or more embodiments of the invention, the automatic import engine (114) may similarly include functionality to access a server of the business (101) and obtain financial documents directly from the business. The automatic import engine may be configured to periodically, at predefined time or event, or upon request of a user obtain the financial documents.

In one or more embodiments of the invention, the manual import engine (115) includes functionality to allow a user to manually upload one or more financial documents to the fixed asset application (111). Specifically, the manual import engine (115) may include functionality to present input fields to a user to allow a user to designate a location of one or more financial documents. The manual import engine (115) further includes functionality to obtain the financial documents from the designated location and store the financial documents in the data repository (130).

In one or more embodiments of the invention, the OCR engine (116) is configured to identify individual characters from a scanned electronic image of the document. Specifically, the OCR engine (116) is configured to identify characters and lines of characters from the pixels of the scanned electronic image to generate a financial document with OCR text.

In one or more embodiments of the invention, the data extraction engine (117) is configured to transform the data format of received financial documents into a data format usable by the analysis unit (118). For example, a file from the financial institution server (106) and/or business (101) may be a comma separated values text file where separate lines separate financial transaction record, and commas separate individual attribute values of the financial transaction record. As another example, the values of attributes may be separated by a tab or other recognized character.

Continuing with the examples, the analysis unit (118) may require, as input, a data format in which specialize characters denote individual fields. Alternatively or additionally, the analysis unit (118) may require a different ordering of attribute values than in the obtained files in one or more embodiments of the invention. In the examples, the data extraction engine (117) includes functionality to change the comma separated and/or tab separated fields in to the specific characters and order the attributes of the fields appropriately.

In one or more embodiments of the invention, the data extraction engine (117) may further include functionality to extract information from financial documents with OCR text. Specifically, the data extraction engine (117) may include functionality to identify and extract words, phrases, and sentences from the OCR text. The data extraction engine (117) may further include functionality to identify attribute values from the words, phrases, and sentences based on location and surrounding text of the attribute values. For example, in a check, the data extraction engine (117) may recognize that text after "pay to the order of" is the payee, text after "$" is an amount, and text after "date" is the date of payment. The data extraction engine may be configured to store the extracted data with the business's financial records as a financial record.

Continuing with FIG. 1, the analysis unit (118) includes functionality to analyze the financial documents and generate one or more financial reports. For example, the analysis unit (118) may include a rules engine (120), a social contribution engine (120), and an accounting system engine (121). Each of the components of the analysis unit is discussed below.

The rules engine (120) includes functionality to identify from the financial records, which records are fixed asset transaction records. Specifically, as discussed above, fixed asset transaction records are comingled in the financial documents with financial transaction records for non-fixed assets. The rules engine (120) includes functionality to apply asset identification rules to the financial transaction records to identify, from the financial transaction records, the fixed asset transaction records. The rules engine (120) may include a user interface (not shown) that includes user interface components (e.g., menu option, input fields, radio buttons, checkboxes, etc.) for a user to create, modify, and remove asset identification rules.

In one or more embodiments of the invention, to identify the fixed asset transaction records and documents about fixed assets, the rules engine (120) includes functionality to iterate through each financial transaction record, and add financial transaction records to an unverified fixed asset transaction list when the data in the financial transaction record conforms to one or more asset identification rules.

In one or more embodiments of the invention, an asset identification rule defines a set of one or more attribute values that indicate that a financial transaction record having the set of attribute values is a fixed asset transaction record. Asset identification rules may be positively or negatively defined. Specifically, when data in the financial transaction record conforms to a positively defined rule, then the financial transaction is identified as a fixed asset transaction. When data in the financial transaction record conforms to a negatively defined rule, then the financial transaction is rejected as a fixed asset transaction. Data in the financial transaction records conform to one or more asset identification rules when the data conforms to attribute values in positively defined asset identification rules and not to attribute values in negatively defined asset identification rules.

Continuing with the asset identification rules, different types of asset identification rules may be used. For example, the asset identification rules may include a cost rule, a date rule, a payee rule, a time rule, a vendor rule, an account rule, a memo rule, and a conflict resolution rule. Other types of rules may exist and may be used without departing from the scope of the invention.

A cost rule may define whether the financial transaction record describes the fixed asset transaction based on a cost identified in the financial transaction record. Specifically, the cost rule may specify that a cost above a certain amount indicates that the transaction is for a fixed asset in one or more embodiments of the invention. In one or more embodiments of the invention, the cost rule may use the absolute value of the cost in order to account for selling as well as purchasing a fixed asset.

Alternatively or additionally, the cost rule may specify that a cost below a certain amount indicates that the transaction is not for a fixed asset. For example, the cost rule may be "If cost of Item>$200, then transaction is fixed asset transaction."

An account rule defines whether the financial transaction record describes the fixed asset transaction based on a financial account identified in the financial transaction record. For example, consider the scenario in which the business (101) uses only specific financial accounts for the purchase/sale of fixed assets. In other words, the business typically does not use other financial accounts for fixed asset transactions. In the example, the account rule may identify attribute values corresponding to the specific financial accounts to specify that the financial transaction having the attribute value is a fixed asset transaction. Alternatively, or additionally, the account rule may identify attribute values corresponding to financial accounts that are not the specific financial accounts to specify that the financial transaction having the attribute value is not a fixed asset transaction. An example of an account rule may be "If Account Number of Check or Debit Card from which payment was made is in list of fixed asset accounts, then add financial transaction record to unverified fixed asset transaction list." The list of fixed asset accounts referenced in the rule may be stored in the data repository (130).

In one or more embodiments of the invention, a date rule defines whether the financial transaction record describes the fixed asset transaction based on a date identified in the financial transaction record. For example, consider the scenario in which the business (101) purchases fixed assets on the last day of the month. In such a scenario, purchases on Aug. 31, 2010 may be deemed fixed asset a transaction. Thus, the date rule may specify a predefined date, range of dates, a relative date with respect to the month, predefined time, and/or range of times that designate the financial transaction as a fixed asset transaction.

In one or more embodiments of the invention, a payee rule defines whether the financial transaction record describes the fixed asset transaction based on a payee identified in the financial transaction record. A vendor rule defines whether a whether the financial transaction describes a fixed asset transaction based on a vendor identified in the financial transaction record. In one or more embodiments of the invention, the payee and vendor rule specifies that a financial transaction record corresponds to a fixed asset transaction record when the financial transaction record has an attribute value that identifies a certain vendor or payee. Similar to the account rule, the payee and/or vendor rule may reference a listing of payees/vendors that correspond to fixed asset transactions. The listing may further include associate with the payee/vendor a type of fixed that the business (101) typically transacts with the payee/vendor.

In one or more embodiments of the invention, the time rule defines whether the financial transaction record describes the fixed asset transaction based on an elapsed time between a date in the financial transaction record and a current date.

A conflict resolution rule may be used to determine which rule prevails in the event a positively defined rule and a negatively defined rule conflict. Specifically, in the case in which a positively defined rule defines a financial transaction record as corresponding to a fixed asset transaction and a negatively defined rule defines the financial transaction record as not corresponding to the fixed asset transaction, the conflict resolution rule defines which asset identification rule controls. The attribute values of the financial transaction record are deemed to conform to only the controlling asset identification rule.

A memo rule defines whether the financial transaction record describes a fixed asset based on information in the memo field. As discussed above, the memo may be a descriptor added to one or more financial transactions. Per the memo rule, a certain code or keyword used indicates that the item is a fixed asset. For example, the memo rule may specify that if the memo includes a code="300", then the financial transaction is a fixed asset transaction for a computer. As another example, the memo rule may specify that if the memo includes keyword, "Lathe", then the financial transaction is a fixed asset transaction for a lathe.

In one or more embodiments of the invention, each asset identification rule is associated with a confidence level. The confidence level defines the likelihood that the asset identification rule will properly designate whether the financial transaction record is a fixed asset transaction record. The confidence level may be initially set as a default confidence level or set by the user in one or more embodiments of the invention. A separate default confidence level may exist for user defined asset identification rules, community defined asset identification rules, and default asset identification rules (discussed below).

As will be discussed below, the confidence level may increase when the user accepts financial transaction records that have been properly designated as fixed asset transactions because of the asset identification rule and decrease when the user rejects financial transaction records that have been improperly designated as fixed asset transactions because of the asset identification rule.

Asset identification rules may include default rules, user-defined rules, and community defined rules. A default rule is an asset identification rule provided by the developer of the fixed asset application (111) in one or more embodiments of the invention. A user-defined rule is an asset identification rule provided by a user associated with the business (101), such as employee, accountant, agent, officer, or another individual or group associated with the business). A community defined rule is an asset identification rule generated by other users, not associated with the business (101), that create asset identification rules for other businesses.

In one or more embodiments of the invention, a social contribution engine (120) connects the fixed asset application (111) to community defined rules and allows the user to define rules for the community. In one or more embodiments of the invention, the social contribution engine (120) includes a user interface to allow users in a community of users to contribute to the asset identification rules of other users by designating specific rules as being usable by other users. Further, the user interface may include user interface components for a user to rate and provide comments about other users and to rate and provide comments about other user's asset identification rules.

In one or more embodiments of the invention, the social contribution engine (120) includes functionality to manage the ratings about the user's rules, account credentials for the user to access their account in the community, and other information about the user. Further, in one or more embodiments of the invention, the social contribution engine (120) may include functionality to associate a confidence level with community defined rules based on a confidence level associated with the user that defined the rule.

For example, if the user is not a professional accountant, than the social contribution engine (120) may associate asset identification rules from the user with an initial lower confidence level than asset identification rules from a user who is a professional accountant. By way of another example, if the community rates the user with a low rating, then the social contribution engine (120) may associate the asset identification rules with a lower confidence level than asset identification rules from other users.

In one or more embodiments of the invention, the accounting system engine (121) includes functionality to manage accounts and generate a financial reports based on identified fixed asset transaction records. Specifically, the fixed asset application (111) may maintain accounting function accounts for accounting purposes. The accounting function accounts are accounts used for the purpose of tracking income, expenses, assets, liabilities, and other financial status indicators of the business. The accounting function accounts may include different records than the financial accounts managed by the financial institution, which stores financial transaction records made by the business using a particular financial product. For example, the accounting function accounts may include a cash account for storing the total amount of cash of the business, a property/plant/equipment account for storing information about assets of the business that are either property, plant, or equipment, a depreciation expense account for storing entries related to current depreciation expenses, an accumulated depreciation account for storing entries related to accumulated depreciation expenses, and other accounting function accounts that may be used to track the financial status of the business.

In addition to managing accounts, the accounting system engine (121) may include functionality to generate reports, such as GAAP reports, tax reports, and other reports for the business (101) related to accounting. Specifically, the accounting system engine may include functionality to generate an unverified fixed asset list (131) and a verified fixed asset list (138) from the fixed asset transaction records.

In one or more embodiments of the invention, a verified fixed asset list (138) includes fixed asset entries (139). Specifically, each entry (139) in the fixed asset list corresponds to a fixed asset entry (139) that provides information about a fixed asset (140). The fixed asset entry (139) includes attributes that defines one or more of the following: an item name of the fixed asset (140), a description of the fixed asset (140), a date in which the fixed asset (140) was acquired, a purchase price, a date in which the fixed asset (140) is disposed of, any cost of disposal, a country in which the fixed asset (140) is used, a depreciation schedule used for the fixed asset (140), accumulated and current depreciation expenses for the fixed asset (140), and/or any other relevant information about the fixed asset (140).

The fixed asset entry (139) may be generated using a fixed asset dictionary in one or more embodiments of the invention. Specifically, the fixed asset dictionary may relate memo field code, an item name, with a description of the fixed asset. The fixed asset dictionary may further define the depreciation schedule for each corresponding fixed asset. Thus, each identified fixed asset may have a different depreciation schedule.

Continuing with the fixed asset application (111), the presentation unit (122) includes functionality to present the unverified fixed asset list (131), a verified fixed asset list (138), and a fixed asset report (141) to the user (124). The presentation unit (122) includes a user verification engine (123) and a report presentation engine (124).

A user verification engine (123) includes functionality to present the unverified fixed asset list (131) to the user. In one or more embodiments of the invention, similar to the verified fixed asset list (138), an unverified fixed asset list (131) is includes fixed asset entries where each entry corresponds to a fixed asset. Specifically, in one or more entries of the invention, one or more fixed assets in the entries are identified by the rules engine (119) and require verification from the user to confirm that the rules engine identified fixed assets are actual fixed assets. The user verification engine (123) further includes functionality to receive input from user submission in the unverified fixed asset list (131) and send an update to the rules engine (119) based on the user submission.

As shown in FIG. 1, each entry in the unverified fixed asset list (131) includes an unverified fixed asset identifier (132), a confidence level (133), at least one asset identification rule (134), and user interface components to allow the user to accept (135) the asset as a fixed asset, reject (136) the asset as a fixed asset, and modify (137) the rule. Each of the components is discussed below.

In one or more embodiments of the invention, the unverified fixed asset identifier (132) provides an identification of the unverified fixed asset. The identification may include one or more of the following: an item name of the fixed asset (140), a description of the fixed asset (140), a date in which the fixed asset (140) was acquired, a purchase price, a date in which the fixed asset (140) is disposed of, any cost of disposal, a country in which the fixed asset (140) is used, a depreciation schedule used for the fixed asset (140), accumulated and current depreciation expenses for the fixed asset (140), and/or any other relevant information about the fixed asset (140). Alternatively or additionally, the unverified fixed asset identifier may include one or more attributes from the fixed asset transaction record. For example, the one or more attributes may identify the particular financial transaction that resulted in the identification of the fixed asset.

In one or more embodiments of the invention, the asset identification rule(s) (134) identify which asset identification rules resulted in the identified fixed asset being designated as a fixed asset. In other words, the asset identification rule(s) (134) identifies the asset identification rule(s) to which the data in the financial transaction record corresponding to the fixed asset conformed.

In one or more embodiments of the invention, the confidence level (133) corresponding to the unverified fixed asset (132) provides a metric of the likelihood that the unverified fixed asset (132) is actually a fixed asset (103) of the business (101). In one or more embodiments of the invention, the confidence level (133) corresponding to the unverified fixed asset (132) is calculated using the confidence level of each of the asset identification rule(s) (134). For example, the confidence level (133) corresponding to the unverified fixed asset (132) may correspond to an average of the confidence level of each of the rule(s) (134).

In one or more embodiments of the invention, each fixed asset identified in the unverified fixed asset list (131) is associated with an accept user interface component (135) and a reject user interface component (136). Selecting the accept user interface component (135) confirms that the unverified fixed asset (132) is actually a fixed asset (103) of the business (101). Selecting the reject user interface component (136) rejects the unverified fixed asset (132) as being actually a fixed asset (103) of the business (101). In other words, unverified fixed assets (132) that are confirmed are added as an entry (139) to the verified fixed asset list (138). Unverified fixed assets (132) that are rejected are not added to the verified fixed asset list (138).

In one or more embodiments of the invention, the modify user interface component (137) allows the user to modify the unverified fixed asset identifier (132) and/or the asset identification rules (134). Specifically, by selecting the modify user interface component (137), the user verification engine (123) may be configured to present the user with a user interface to change one or more asset identification rules. The user interface may be a separate user interface from the unverified fixed asset list or may be embedded in the unverified fixed asset list. Further, each of the asset identification rules (134) may be associated with a separate modify user interface component (137). Additionally or alternatively, each component of the unverified fixed asset identifier (132) may be associated with a modify user interface component (137). Additionally or alternatively, unverified fixed asset identifier (132) and/or the asset identification rules (134) may include the modify user interface component (137). For example, the unverified fixed asset identifier (132) and/or the asset identification rules (134) may correspond to pre-populated input fields. Other user interface configurations may be used without departing from the scope of the invention.

Rather than presenting an unverified fixed asset list (131), the user verification engine (123) may be configured to present an unverified fixed asset transaction list (not shown). The unverified fixed asset transaction list may include the asset identification rules (134), the confidence level (133), an accept user interface component (135), a reject user interface component (136), a modify user interface component (137), and/or other user interface components discussed above. Thus, rather than verifying fixed assets, a user may verify the fixed asset transactions correspond to actual transactions of fixed assets.

Returning to the presentation unit (122), the report presentation engine (124) includes functionality to present the verified fixed asset list (138) and/or one or more reports after the fixed asset is identified. For example, the reports may include GAAP reports, tax reports, and other reports for the business (101) related to accounting. One type of report that the report presentation engine (124) may be configured to present is a verified fixed asset report (141). The verified fixed asset report (141) includes an identifier of the verified fixed asset (140), a current depreciation expense (142) and a tax deduction resulting from the depreciation expense (143). Additionally or alternatively, the verified fixed asset report (141) may include accumulated depreciation for the verified fixed asset (140). Further, the depreciation expense (142) and the tax deduction (143) may include a total current depreciation expense and a total tax deduction for all fixed assets.

Continuing with FIG. 1, in one or more embodiments of the invention, the service provider server A (110) may be connected to service provider server B (126). In one or more embodiments of the invention, service provider server B (126) includes functionality to host data repository (130). Data repositories including data repository (130) may contain data associated with fixed asset application (111). In one or more embodiments of the invention, the data repository (130) is any type of storage unit (e.g., a file system, database, collection of tables, or any other storage mechanism) for storing data. Further, the data repository (130) may include multiple different storage units. The multiple different storage units may or may not be of the same type or located at the same physical site.

For example, data repository (130) may include a relational database, one or more tables, and/or any other data structure for storing data entries associated with fixed asset application (111). Data repository (130) may also be a spreadsheet containing data cells associated with fixed asset application (111). In one or more embodiments of the invention data repository (130) may be implemented with many technologies. Data repository (130) may receive data from various sources, including fixed asset application (111), and any of the engines of fixed asset application (111), over network B (125). After receiving data from fixed asset application (111), data repository (130) may process (i.e. modify, transform, format) the data, and then store the data. The data repository (130) may receive and store data from other entities (e.g., the financial institution server (106), the business (101)) beyond fixed asset application (111), and may perform other functions beyond those disclosed. Further, service provider server B (126), and the data stored on this server may be owned and/or operated by a service provider (e.g. the owner, developer, and/or manager of the fixed asset application).

In one or more embodiments of the invention, data in the data repository (130) may include a rules data repository, a fixed asset data repository, a financial transaction data repository, one or more lists discussed above with relation to the rules, and any other data. The rules data repository stores asset identification rules in one or more embodiments of the invention. The fixed asset data repository stores information about fixed assets. The financial transaction data repository in one or more embodiments of the invention stores financial transaction records.

Although not shown in FIG. 1, the various reports and lists from the fixed asset application (111) may be displayed in a graphical user interface. The graphical user interface may be viewable in a web browser, an application window, or any combination thereof. The graphical user interface may include standard web elements, including video, audio, and text, as well as interface technologies not limited to text submission on forms, voice capture, and user gesture interpretation. In one or more embodiments of the invention there may be various other display technologies used by and to view the graphical user interface.

Although FIG. 1 shows one configuration of components, other configurations may be used without departing from the scope of the invention. Specifically, the above components may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), or a local area network (LAN)), with wired and/or wireless segments. In one or more embodiments of the invention, there may be more than one of the engines and units discussed above. Further, for example, service provider server A (110) and service provider server B (126) may be distinct devices or the same device.

Additionally, although FIG. 1 and discussed above shows the fixed asset application (111) and data repository (130) as remote from the business (101), the fixed asset application (111) and/or the data repository (130) may be stored and execute locally on one or more local computing device(s) (not shown) of the business (101). In such a scenario, the service provider may not exist or may only provide support for the fixed asset application (111). For example, the service provider may be a software development company that creates the fixed asset application (111).

Additionally, although FIG. 1 shows the fixed asset application (111) as being divided into multiple units and engines, the functionality performed by two or more units and/or engines may be combined into a single component. In other words, other software designs may be used without departing from the scope of the invention.

Figure 2A:
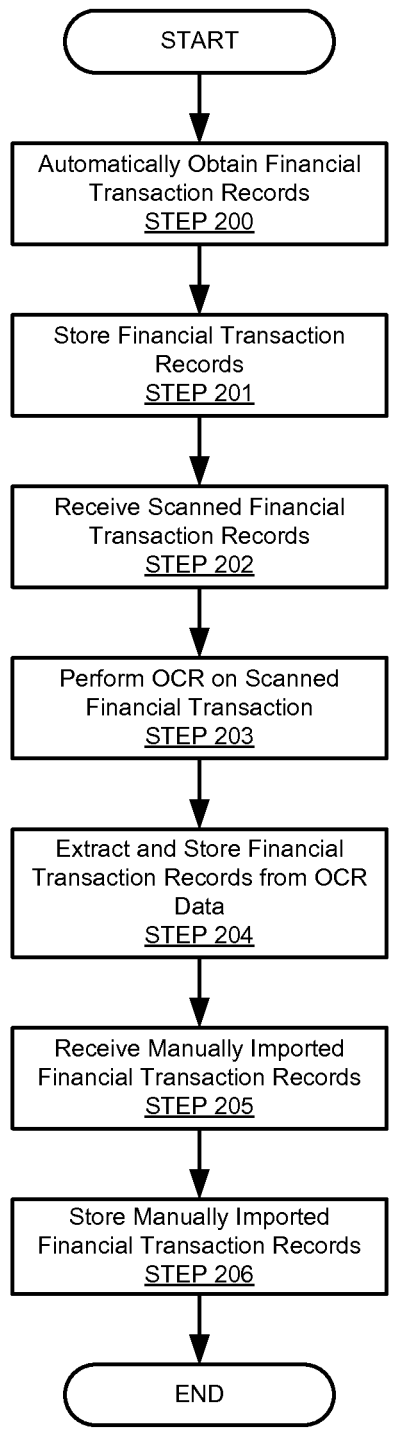
FIGS. 2A-2C show flowcharts in accordance with one or more embodiments of the invention.
Figure 2B:
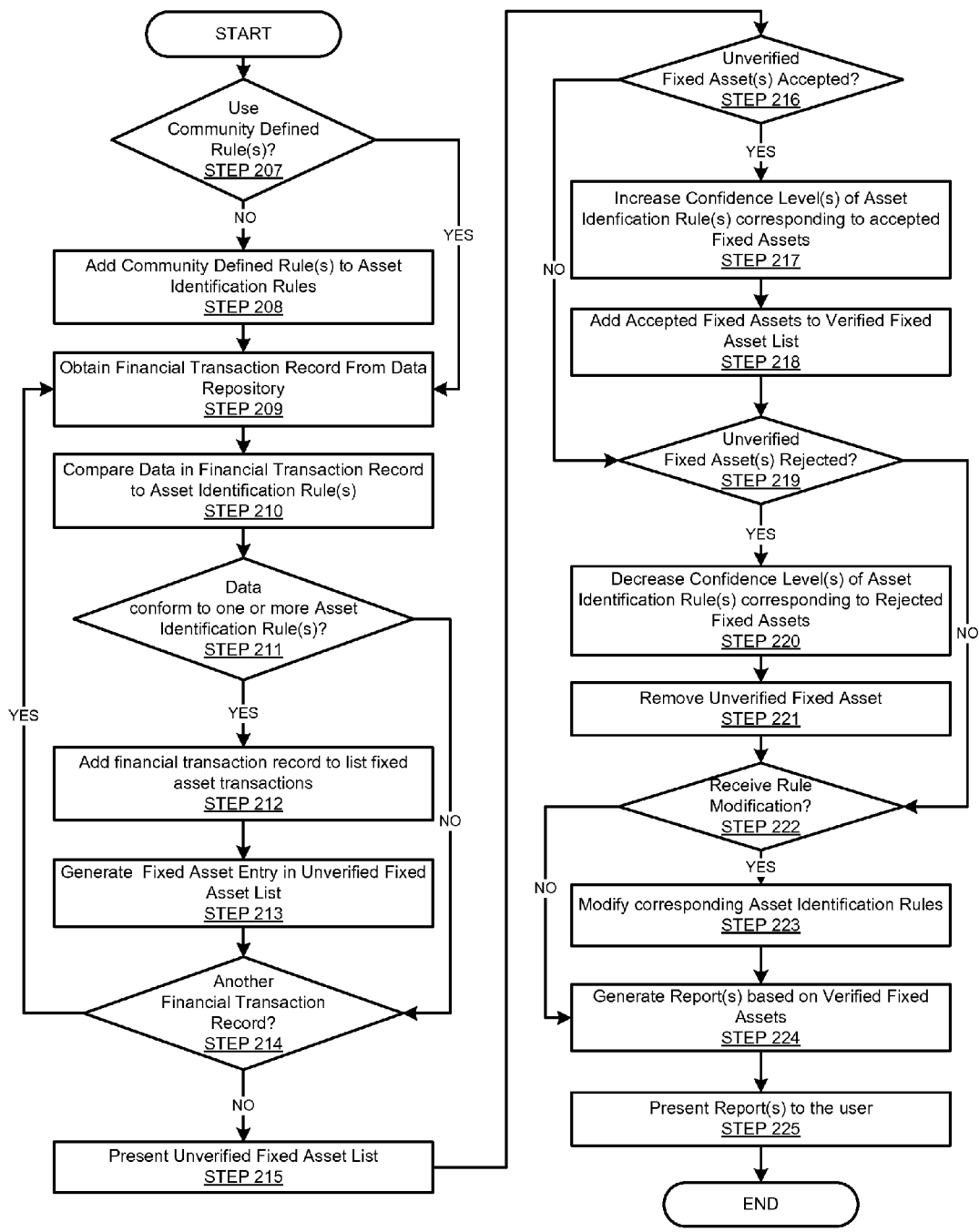
Figure 2C:
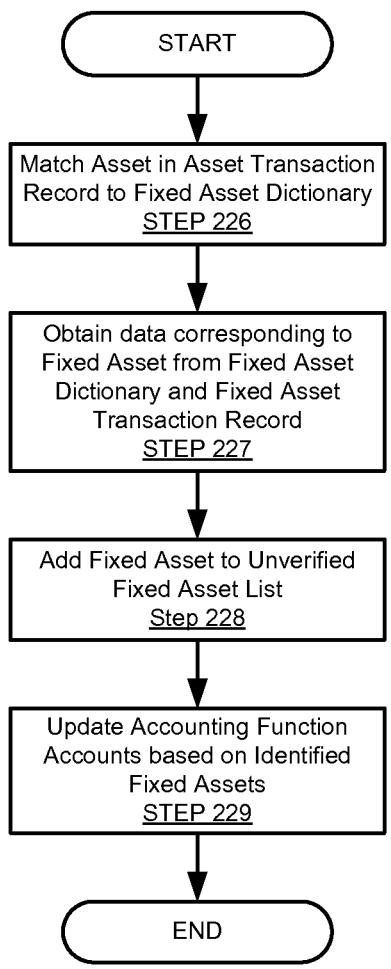

FIGS. 2A-2C shows flowcharts in accordance with one or more embodiments of the invention. The process shown in FIGS. 2A-2C may be used, for example, with the system (100), to verify a fixed asset. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction. As another example, determination steps may be performed by performing a test, such as checking a data value to test whether the value is consistent with the tested condition in accordance with one or more embodiments of the invention.

FIG. 2A shows a flowchart for importing financial transaction records to the fixed asset application in one or more embodiments of the invention. In STEP 200, financial transaction records are automatically obtained in one or more embodiments of the invention. For example, the fixed asset application may use the business's credential, provided by the business, for each financial institution to access each financial institution's server and request a file with the financial transaction records.

In STEP 201, the financial transaction records that are automatically obtained are stored in the data repository in one or more embodiments of the invention. Storing the financial transaction records in the data repository may include performing data manipulation on the financial transaction records. Specifically, each financial transaction record may be separately extracted from files provided by the financial institution servers based on the separators used in the files. Further, the ordering of the attributes and the format of the attributes in the records may be updated. The data manipulation may be performed based on a pre-stored mapping between the format of transaction records received from the financial institution and the format of transaction records required by the fixed asset application.

In STEP 202, one or more scanned financial transaction records may be received. For example, the received scanned financial transaction records may correspond to an electronic image of a check, a financial institution statement, and other such records.

In STEP 203, OCR is performed on the scanned financial transaction records. The OCR recognizes individual characters from the scanned financial transaction in order to create OCR data.

In STEP 204, from the OCR data, financial transaction records are extracted and stored. The financial transaction records may be extracted by combining characters into words and phrases, and using the context of the extracted data (e.g., location and surrounding words and phrases) to identify individual components of a transaction record. For example, a collection of grid lines may be used to indicate multiple transaction records, where each transaction record has attribute values for a same set of attributes defined by the grid.

In STEP 205, manually imported financial transaction records are received in one or more embodiments of the invention. For example, a user may select a user interface component to manually enter attributes of a new financial transaction record, or to provide the fixed asset application with the location of additional financial transaction records.

In STEP 206, the manually imported financial transaction records are stored in one or more embodiments of the invention. Storing the manually imported financial transaction records may be performed as discussed above with regards to STEP 201.

While FIG. 2A, discussed above, shows a flowchart of a method to obtain current financial transaction data, other methods may be used without departing from the scope of the invention. Continuing with the discussion of fixed asset identification, FIG. 2B shows a flowchart of a method to identify from financial transaction records, which financial transaction records are fixed asset transaction records in one or more embodiments of the invention. The steps described below and in FIG. 2B may be instigated, for example, by a user selecting a menu option or other user interface component to perform the fixed asset identification.

In STEP 207, a determination is made whether to use community defined rules. For example, the user may select an option for whether to use the community defined rules. Further, in one or more embodiments of the invention, the user may select parameters of the contributing user. For example, the user may require that the contributing user be an accountant, have a certain rating level, and/or have other qualification in order to use the community defined rules from the contributor.

In STEP 208, if a determination is made to use the community defined rules, then the community defined rules are added to the asset identification rules in one or more embodiments of the invention. In one or more embodiments of the invention, only the community defined rules that conform to the user's parameters for the contributing user are added. Further, in one or more embodiments of the invention, the default confidence level of each community defined rules may be set lower than the default confidence level of user defined rules and default rules.

Regardless of whether community defined rules are used, the asset identification rules are used to identify fixed asset transactions. Specifically, the fixed asset application may iterate through the financial transaction records to identify which financial transaction records conform to one or more rules. In STEP 209, a financial transaction record is obtained from the data repository.

In STEP 210, data in the financial transaction record is compared with the asset identification rules. Specifically, attribute values in the financial transaction records are compared with each asset identification rule to determine whether the attribute value conforms to the rule.

For example, comparing data in the financial transaction to a payee/vendor rule may include determining whether the attribute values corresponding to the payee and/or the vendor of the financial transaction are in a payee/vendor list. If the attribute value(s) are in a list, then the financial transaction record conforms to the rule.

By way of another example, for the cost rule, the determination may be whether the cost of the financial transaction as defined by the corresponding attribute value in the financial transaction record is greater than the amount set by the cost rule. If the attribute value is greater than the amount set, then the financial transaction record conforms to the cost rule. Similar operations may be performed for other rules.

In one or more embodiments of the invention, when a positively defined rule (discussed above) and a negatively defined rule (discussed above) conflict such that the data in the financial transaction record conforms to both rules, a conflict resolution rule that defines which asset identification rule controls may be used. Specifically, the conflict resolution rule resolves the conflict between the positively defined rule and the negatively defined rule.

In STEP 211, a determination is made whether the data in the financial transaction record conforms to one or more asset identification rules. If data in the financial transaction record conforms to one or more asset identification rules, then in STEP 212, the financial transaction record is designated as a fixed asset transaction and added to the list of fixed asset transaction records. Adding the financial transaction record to the list of fixed asset transaction records may include copying one or more or all attributes in the financial transaction record to a separately maintained data structure having only fixed asset transaction records. Alternatively or additionally, adding the financial transaction records to the list of fixed asset transaction records may include setting an attribute value of the transaction record to indicate that the transaction record corresponds to a fixed asset transaction. In such a scenario, a separate data structure may optionally not be used to maintain fixed asset transaction records.

In STEP 213, a fixed asset entry is generated in the unverified fixed asset list. Generating the fixed asset entry is discussed below and in FIG. 2C.

Although not shown in FIG. 2B, when a fixed asset entry and/or a fixed transaction record is added to the lists, a confidence level for the fixed asset may be calculated. In one or more embodiments of the invention, calculating the confidence level may be performed by calculating an average of the confidence levels of each of the asset identification rules conformed to by the fixed asset transaction record.

Continuing with FIG. 2B, in STEP 214, a determination is made whether another unprocessed financial transaction record exists. If another unprocessed financial transaction record exists, then the method may repeat with STEP 209 to process the next financial transaction record.

In STEP 215, an unverified fixed asset list is presented to the user in one or more embodiments of the invention. Specifically, in one or more embodiments of the invention, the user may view the unverified fixed asset list and accept and/or reject the unverified fixed assets. Rather than displaying the unverified fixed asset list, the unverified fixed asset transaction list may be displayed to the user without departing from the scope of the invention.

In STEP 216, a determination is made whether an unverified fixed asset is accepted. For example, the user may have selected an accept user interface component corresponding to one or more unverified fixed assets.

If an unverified fixed asset is accepted, then the unverified fixed asset is deemed a verified fixed asset. In STEP 217, based on the acceptance of an unverified fixed asset, the confidence levels of the asset identification rules used to identify the fixed asset are increased. Increasing the confidence levels may be performed by incrementing the value of the confidence level or performing another mathematical operation on the confidence level to increase the value.

In STEP 218, also based on the acceptance, the unverified fixed asset is added to the verified fixed asset list. Thus, the business may depreciation expenses from the fixed asset to reduce the business's taxes.

In STEP 219, a determination is made whether an unverified fixed asset is rejected. For example, the user may have selected a reject user interface component corresponding to one or more unverified fixed assets.

In STEP 220, based on the rejection of an unverified fixed asset, the confidence levels of the asset identification rules used to identify the unverified fixed asset are decreased. Decreasing the confidence levels may be performed by decrementing the value of the confidence level or performing another mathematical operation on the confidence level to decrease the value. In STEP 221, also based on the rejection, the unverified fixed asset is removed from the unverified fixed asset list in one or more embodiments of the invention.

Continuing with FIG. 2B, in STEP 222, a determination is made whether a rule modification is received. Specifically, a determination is made whether the user selects to modify one or more asset identification rules. In one or more embodiments of the invention, the user may modify the asset identification rules within the interface of the unverified fixed asset list. Alternatively or additionally, the user may modify the asset identification rules in a separate user interface component.

In STEP 223, if the user selects to modify one or more asset identification rules, then the asset identification rules are modified according to the user. For example, the user may update lists used to identify fixed assets. As another example, the user may change and/or add parameters in one or more asset identification rules. By way of another example, the user may add or remove asset identification rules from the data repository. In one or more embodiments of the invention, the modified asset identification rules are stored in the data repository.

In STEP 224, reports are generated based on the verified fixed assets. When new assets are identified, the business is able to capture the expense and appropriately account for the depreciation expense over the useful life of the asset. Thus, the identification of a fixed asset using the asset identification rules allows for a more complete and accurate recording of the businesses financial status. In one or more embodiments of the invention, generating the accounting reports may be performed by the accounting engine performing accounting functions. For example, the accounting engine may use data in the accounting function accounts to generate reports based on the data.

In STEP 225, the reports are presented to the user. For example, the reports may include GAAP reports, tax returns, verified fixed asset reports, and other reports used for accounting purposes.

FIG. 2C shows a flowchart for generating a fixed asset entry in one or more embodiments of the invention. In STEP 226, the identified fixed asset (e.g., verified or unverified fixed asset) in the fixed asset transaction record is matched to the fixed asset dictionary. In one or more embodiments of the invention, matching the fixed asset transaction record may include identifying a name or code for the fixed asset from attributes in the fixed asset transaction record. The attribute may directly match or indirectly match an entry in the fixed asset dictionary. For example, one or more attribute values (e.g., memo field, description, etc.) may directly match an entry in the fixed asset dictionary. As another example, the payee/vendor listing may be used to indirectly identify the fixed asset from the fixed asset dictionary. In the example, the payee/vendor listing may include an association between the payee/vendor and product identifiers of one or more products that the business purchases from the payee/vendor. In the example, the payee/vendor listing may be used in conjunction with the payee/vendor identified in attributes of the fixed asset transaction record to identify the corresponding product. The corresponding product may be used to identify the entry in the fixed asset dictionary.

In STEP 227, using the entry in the fixed asset dictionary, data is obtained from the fixed asset dictionary and the fixed asset transaction record. Specifically, the data to populate the fields of an entry in the unverified and/or verified fixed asset list is obtained. For example, the date of purchase and purchase price may be obtained from the fixed asset transaction record, and the description, item code, depreciation schedule, and other information may be obtained from the fixed asset dictionary. Additional data for a fixed asset entry may be, for example, provided later by a user.

In STEP 228, the fixed asset is added to the unverified fixed asset list. Specifically, an entry is added to the unverified fixed asset list in one or more embodiments of the invention.

In STEP 229, the accounting function accounts are updated based on the identified fixed asset. Specifically, the purchase and/or selling of a fixed asset results in changes to the business's accounting function accounts. For example, for the selling of a fixed asset, the property/plant/equipment account may be debited by the amount that the business received, the cash account may be credited by the amount received, and depreciation accounts may be updated to reflect that the asset is disposed. By way of another example, for business purchasing a fixed asset, the property/plant/equipment account may be credited by the amount that the business received, the cash account may be debited by the amount received, and depreciation accounts may be updated to include information about the cost basis of the fixed asset and the depreciation schedule for the fixed asset.

As shown in FIGS. 2A-2C, in one or more embodiments of the invention, not only are financial transactions that are fixed asset transactions identified from a myriad of financial transactions that the business may perform, the accounting function accounts may be automatically updated to reflect transactions related to fixed assets in one or more embodiments of the invention. Thus, the business is able to have a more accurate accounting of the business's finances.

FIGS. 3-5E show examples in accordance with one or more embodiments of the invention. The following examples are for explanatory purposes only and not intended to limit the scope of the invention.

FIG. 3 shows an example verified fixed asset list (300) in accordance with one or more embodiments of the invention. The example shown in FIG. 3 may be used, for example, with the system (100), to verify fixed assets. The elements shown in FIG. 3 may differ among embodiments of the invention, and one or more of the elements may be optional.

As shown in the example FIG. 3, the fixed asset list includes a fixed asset entry (320) for each corresponding fixed asset. Each fixed asset entry (320) includes values for attributes (e.g., 305-318) of the fixed asset. For example, the fixed asset entry (320) may include a unique identifier attribute value (305) of the particular fixed asset. In the example shown in FIG. 3, the unique identifier attribute value is a numeric identifier of the particular item. Thus, if the business includes multiple computer systems, for example, each computer system may have a corresponding unique identifier. Alternatively, when fixed assets are depreciated as a group, each group of fixed assets may have a single corresponding entry with a single corresponding unique identifier.

Continuing with the example FIG. 3, the attributes may also include a description (306) of the fixed asset, an amount paid (307) by the business for the fixed asset, the payee (308) of the fixed asset, the date in which the fixed asset was purchased (309), the account number (310) or other account identifier of a financial account used to purchase the fixed asset, and an identifier of the financial institution (311) having the account to purchase the fixed asset. Additionally or alternatively, the attributes may include a check number (312) if a check is used to purchase the fixed asset, and a funds clearing date at which the funds cleared the business's account.

Additionally or alternatively, the attributes may include a memo field (314) for the fixed asset, other information about the fixed asset (315), a depreciation model identifier (316) used to identify the depreciation model to depreciate the fixed asset, the current depreciation expense (317), and/or a tax deduction (318) that the business may have because of the depreciation expense. FIG. 3 is only an example of attributes that may be in the fixed asset list, other attributes may be included and some attributes shown may be removed without departing from the scope of the invention.

Figure 4:
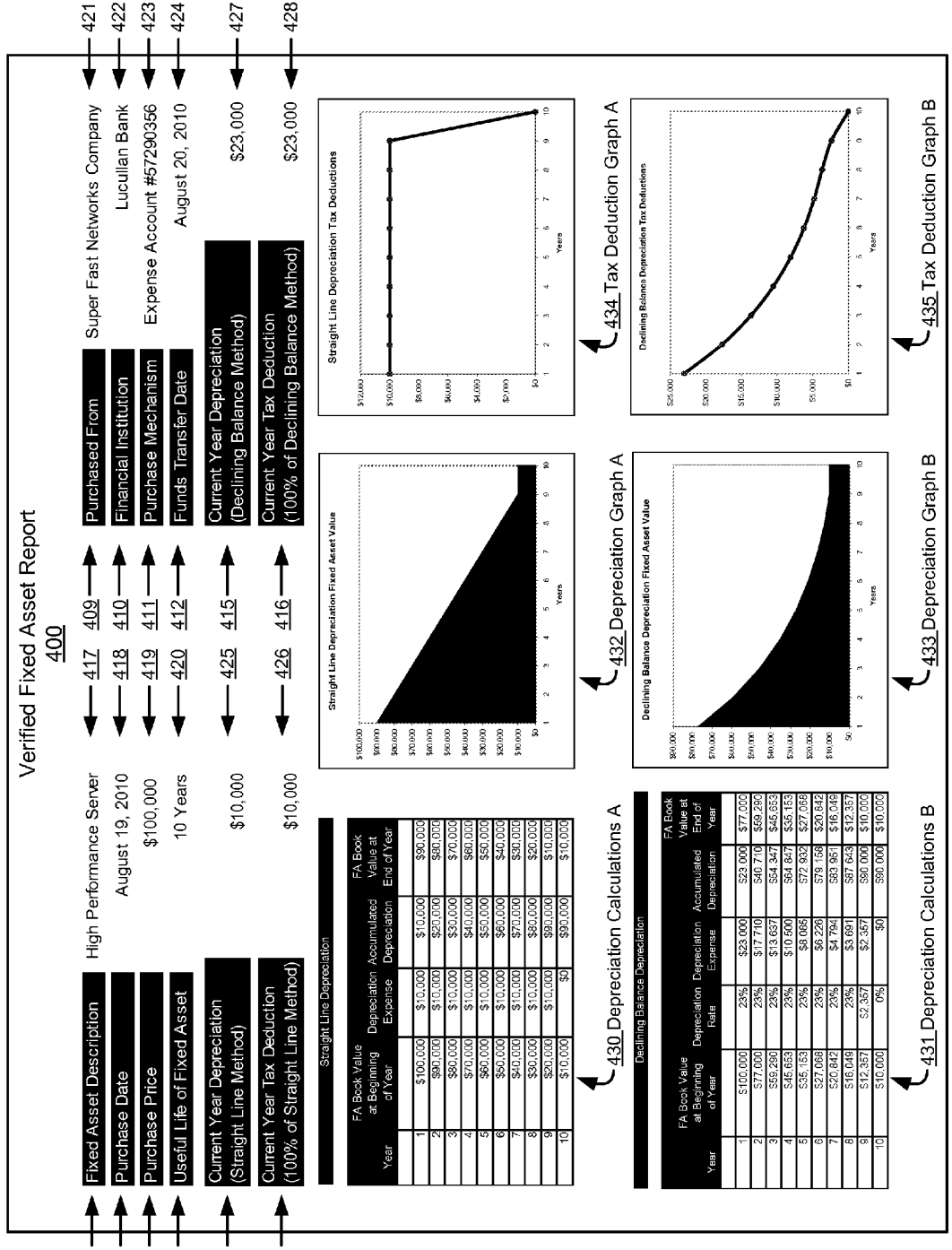
Figure 4A:
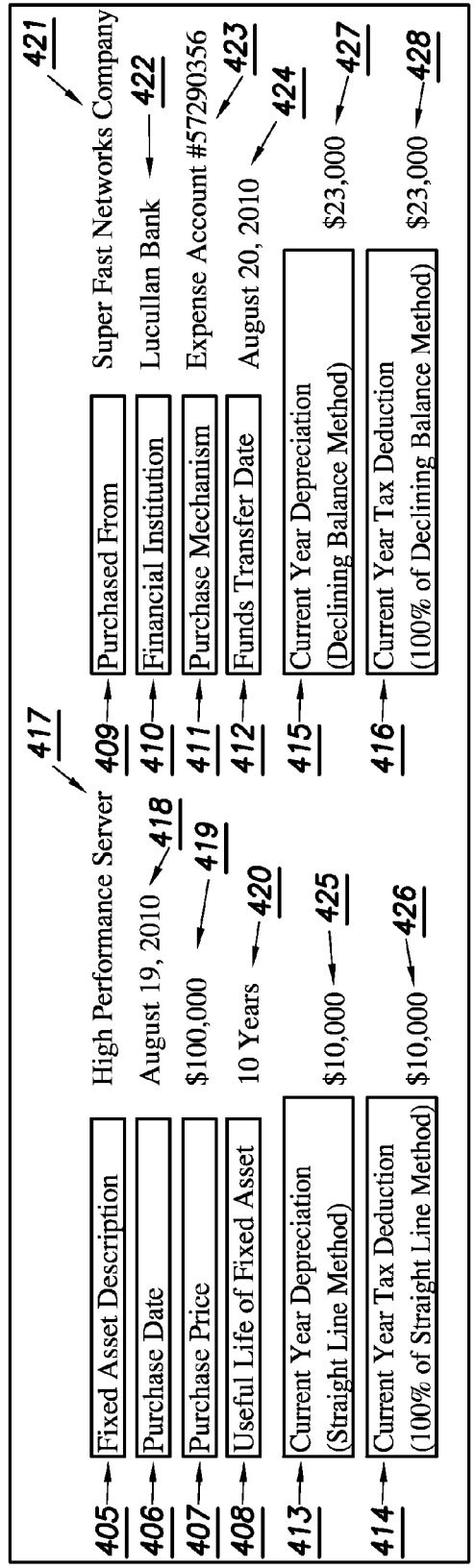

FIGS. 4A-4C show an example verified fixed asset report in accordance with one or more embodiments of the invention. The example shown in FIGS. 4A-4C may be used, for example, with the system (100), to analyze a fixed asset and determine a depreciation schedule to use in one or more embodiments of the invention. The elements shown in FIGS. 4A-4C may differ among embodiments of the invention, and one or more of the elements may be optional.

In one or more embodiments of the invention, the example fixed asset report may be generated as one of the reports by the accounting system engine in one or more embodiments of the invention. As shown in FIG. 4A, the verified fixed asset report (400) may include one or more of the following: a fixed asset description (405) with a value (417) that describes the fixed asset (e.g., a high performance server), a purchase date (406) with a value (418) that defines when the fixed asset was purchased (e.g., Aug. 19, 2010), a purchase price (407) with a value (419) that defines the amount paid for the fixed asset (e.g., $100,000), an identifier of the payee (409) with a value (420) defining who the payee is (e.g., Super Fast Network Company), a financial institution identifier (410) with a value (422) defining which financial institution had the account used to purchase the asset (e.g., Lucullan Bank), a purchase mechanism (411) with a value (423) defining the account used to purchase the fixed asset (e.g., Expense Account Number 57290356), and a funds transfer date (412) with a value (424) defining when the funds were transferred.

The verified fixed asset report (400) may further show a user how different depreciation schedules affect the depreciation expense of the fixed asset over time. For example, the verified fixed asset report may be used to compare the straight-line depreciation schedule with a declining balance depreciation schedule. As shown in the example FIG. 4A, the verified fixed asset report may include a current year depreciation (413) with a value (425) defining the depreciation expense using a straight line method (e.g., $10,000) and a current year depreciation (415) with a value (427) defining the depreciation expense using a declining method (e.g., $23,000). Similarly, the verified fixed asset report may include a current year tax deduction because of the fixed asset (414) with a value (426) defining the tax deduction because of the fixed asset using a straight line method (e.g., $10,000) and a current year tax deduction because of the fixed asset (416) with a value (428) defining the tax deduction because of the fixed asset using a declining method (e.g., $23,000).

Further, in one or more embodiments of the invention, the verified fixed asset report (400) may show a charts and graphs. FIG. 4B shows a continuation of the verified fixed asset report (401) showing the charts and graphs for the straight line depreciation schedule. FIG. 4C shows a continuation of the verified fixed asset report (402) showing the charts and graphs for the declining balance depreciation schedule. As shown in FIGS. 4B-4C, the charts and graphs show depreciation over time using the straight line schedule (e.g., depreciation calculations A (430), depreciation graph A (432), and tax deduction graph A (434) in FIG. 4B) and using the declining balance schedule (e.g., depreciation calculations B (431), depreciation graph B (433), and tax deduction graph B (435) in FIG. 4C). Thus, using the verified fixed asset report, in one or more embodiments of the invention, the user may select for newly identified and verified fixed assets, which depreciation schedule to use.

FIGS. 5A-5E show an example in accordance with one or more embodiments of the invention. The example shown in FIGS. 5A-5E may be used, for example, with the system (100), to verify a fixed asset. The portions shown in FIGS. 5A-5E may differ among embodiments of the invention, and one or more of the portions may be optional.

For the following example, consider the scenario in which the business is an equipment repair company to repair the equipment used by construction companies in the building of skyscrapers. Throughout the year 2010, the business performs various financial transactions with the business's customers and with other businesses. For example, the business may purchase office supplies, parts for repairing the equipment, selling of services to repair the equipment, and fixed assets which the business will use in the course of the business.

When the accountant hired by the business prepares the tax return for the year 2010, the accountant needs to identify which business records correspond to fixed assets and therefore are deductable over the useful life of the fixed asset, and which transaction records correspond to current expenses that are immediately deductible. The accountant also needs to identify whether any fixed assets are disposed of in 2010. Accordingly, the accountant accesses the fixed asset application and requests that the fixed asset application obtain financial transaction records from the business's various financial institutions. The accountant may further scan in additional financial transaction records and request that the fixed asset account automatically populate the data repository with the scanned financial transaction records.

Figure 5A:
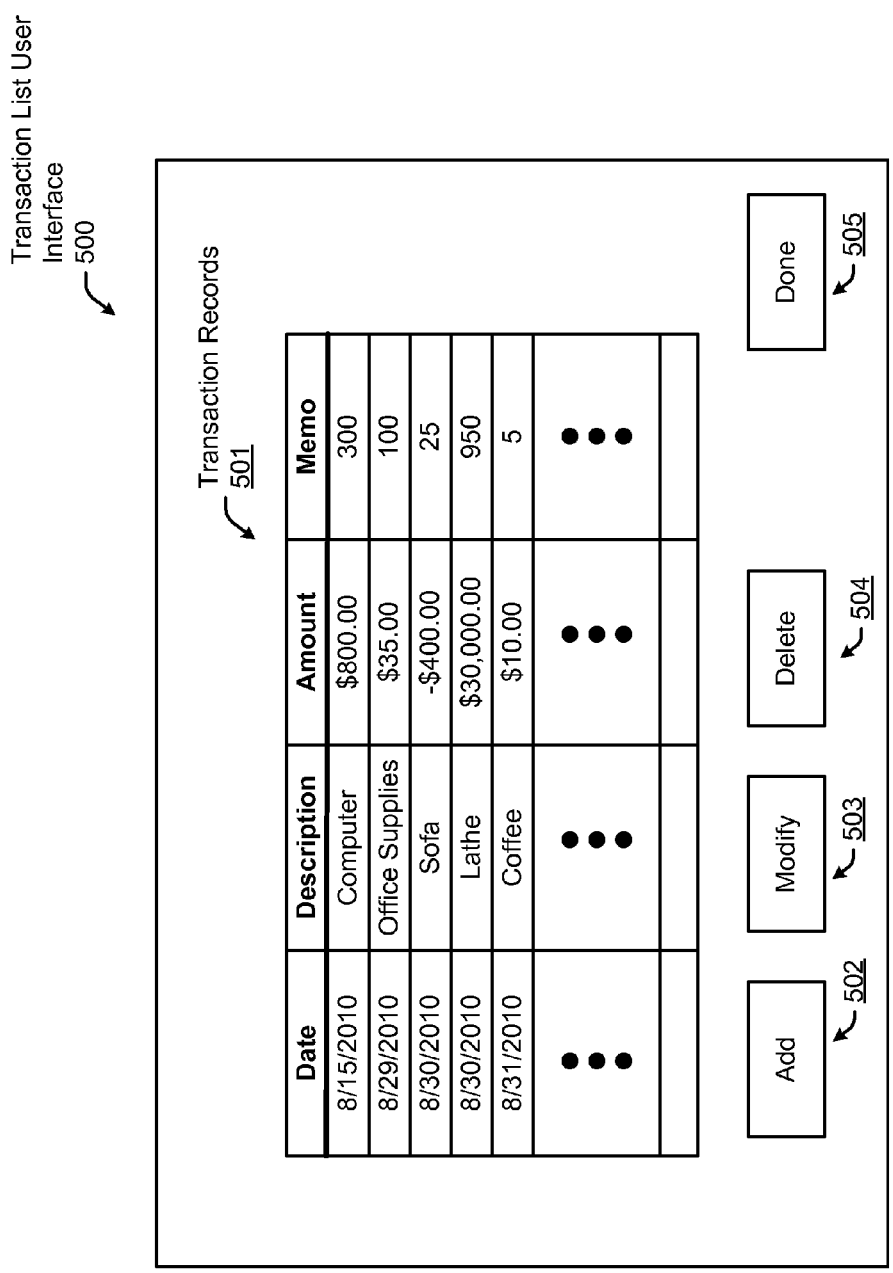

FIG. 5A shows an example transaction list user interface (500) that the accountant may view after fixed asset application obtains the financial transaction records. As shown in FIG. 5A, in the example user interface (500), various financial transaction records (501) are listed. The financial transaction records (501) may include attributes, such as date, description, amount, and memo in the example. Although FIG. 5A shows the description as the item purchased, the description may alternatively only include the payee of the financial transaction. Alternatively or additionally, the accountant or another person associated with the business may provide the fixed asset application with the description of the actual item purchased.

While viewing the financial transaction records (501), the accountant may add new transaction records by selecting the add button (502), modify existing records using the modify button (503), delete existing records using the delete button (504), or select the done button (505) to indicate that the accountant is finished viewing the financial transaction records.

Figure 5B:
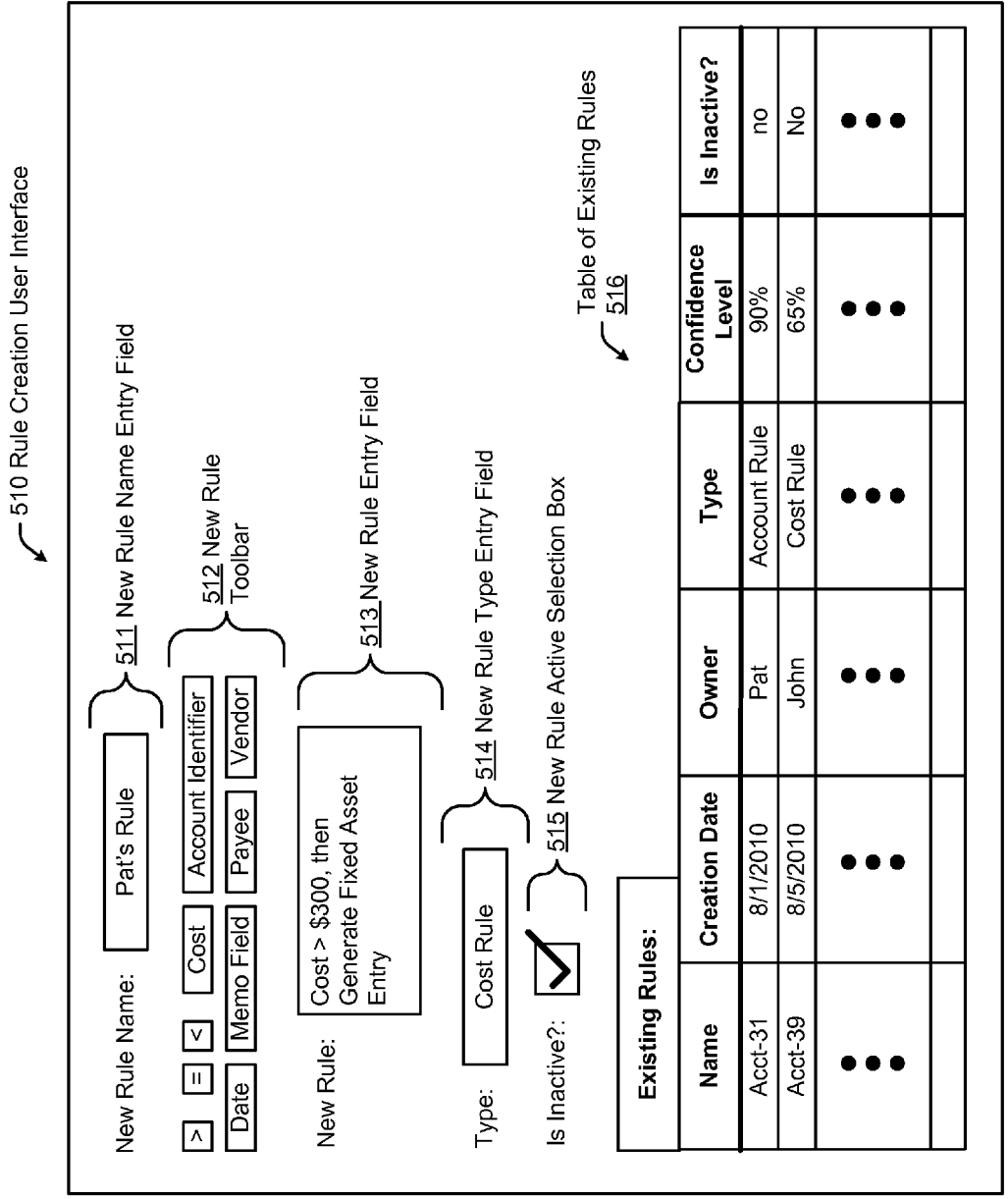

Continuing with the example, the accountant may use the fixed asset application to create new asset identification rules and view existing asset identification rules in one or more embodiments of the invention. FIG. 5B shows an example rule creation user interface (510) for the accountant to create an asset identification rule and view existing asset identification rules.

As shown in the example FIG. 5B, for a new rule, the accountant may enter a new rule name in the new rule name entry field (511). Further, the accountant may user buttons in the new rule toolbar (512) to specify the new rule in the new rule entry field (513). In the example FIG. 5B, the accountant specifies that if the cost is greater than $300, then the financial transaction records should be deemed a fixed asset transaction record and a fixed asset entry should be generated. Further, in the example, the accountant may define the type of the new rule in the new rule type entry field (514) and specify whether the rule is inactive (i.e., should be used) in the new rule active selection box (515). Once the accountant defines the new rule, the new rule is added to the table of existing rules (516).

In the example, in the table of existing rules (516), the accountant may view metadata about the rule, such as the name, creation date, owner or creator of the rule, the type of rule, the confidence level of the rule, and whether the rule is inactive. Although not shown in FIG. 5B, the accountant may also view who modified the rule, and the rule itself.

Continuing with the example, in addition to the asset identification rules, the accountant may also view and/or update the payee/vendor listing used in the rules. FIG. 5C shows an example payee/vendor listing (520) in one or more embodiments of the invention. As shown in the example, each payee/vendor may have one or more entries that specify which fixed assets that the business typically purchases from the payee/vendor. Thus, if a payee/vendor in a financial transaction record is in the payee/vendor listing, then the financial transaction record is deemed a fixed asset transaction record according to the asset identification rules. Further, the type of fixed asset may be extracted from the payee/vendor listing.

In the example, the accountant may also view and/or update the fixed asset dictionary. FIG. 5D shows an example fixed asset dictionary (521) in one or more embodiments of the invention. As shown in the example, the fixed asset dictionary may associate a code used in a memo, with an item name fixed asset, and a description for the fixed asset. Thus, the fixed asset dictionary (521) may be further used to identify what the fixed asset is in the fixed asset transaction record.

Figure 5E:
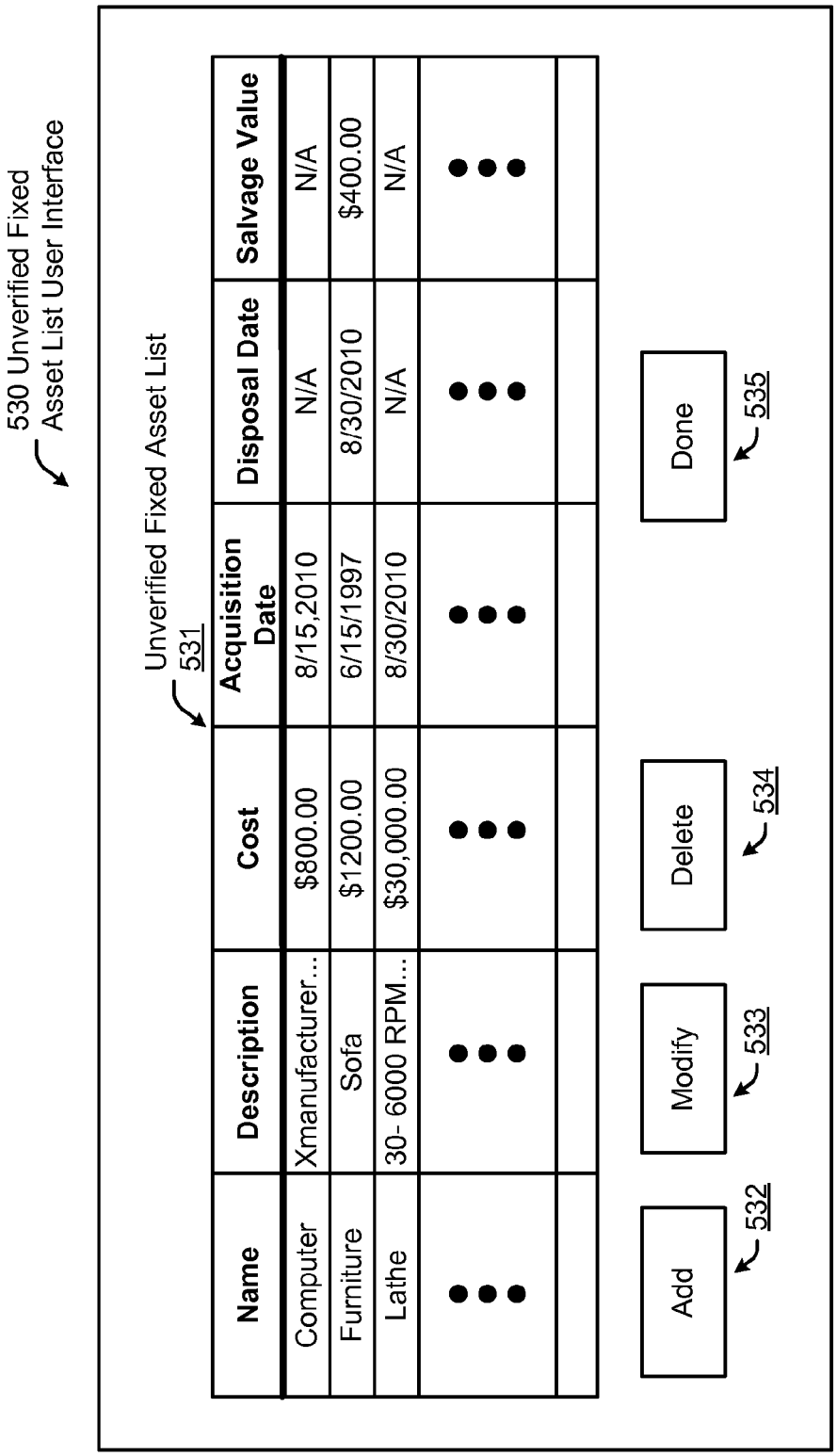

Once the accountant is satisfied that the asset identification rules, payee/vendor listing, and fixed asset dictionary is correct, the accountant may request that an unverified fixed asset list is generated. FIG. 5E shows an unverified fixed asset list user interface (530) generated from the financial transaction records in FIG. 5A. As shown in the unverified fixed asset transaction list (531) in the user interface (530), financial records that are not fixed assets (e.g., office supplies costing $35.00, coffee) are not in the fixed asset list. Additionally, as shown in FIG. 5A, fixed asset transactions are used to update existing entries in the fixed asset list, such as to account for the sale of fixed assets. For example, as shown in example FIG. 5A, the sofa was sold. Accordingly, the fixed asset transaction corresponding to the sale of the sofa is used in FIG. 5E to update the fixed asset entry for the sofa to show the disposal date as the date of sale and the salvage value as the sale price. Additionally, as shown in FIG. 5E, the fixed asset dictionary shown in FIG. 5D may be used to update the description in the fixed asset list.

Thus, using the unverified fixed asset list, the accountant may view the fixed assets that the financial asset application identified. Further, the accountant may add new fixed asset entries by selecting the add button (502), modify existing fixed asset entries using the modify button (503), delete existing fixed asset entries using the delete button (504), or select the done button (505) to indicate that the accountant is finished viewing the unverified fixed asset list. Further, in the example, although not shown in FIG. 5E, the accountant may view the confidence level for the fixed asset entry, the asset identification rules to create the fixed asset entry, and selection buttons to accept or reject the fixed asset entries.

Based on the accountant's changes and the fixed asset transactions identified by the fixed asset application, the business's accounting function accounts are updated. Further, reports for the business may be generated based on the identified fixed asset transactions. Accordingly, the fixed asset application assists in creating a complete and accurate reporting of the business's finances.

Figure 6:
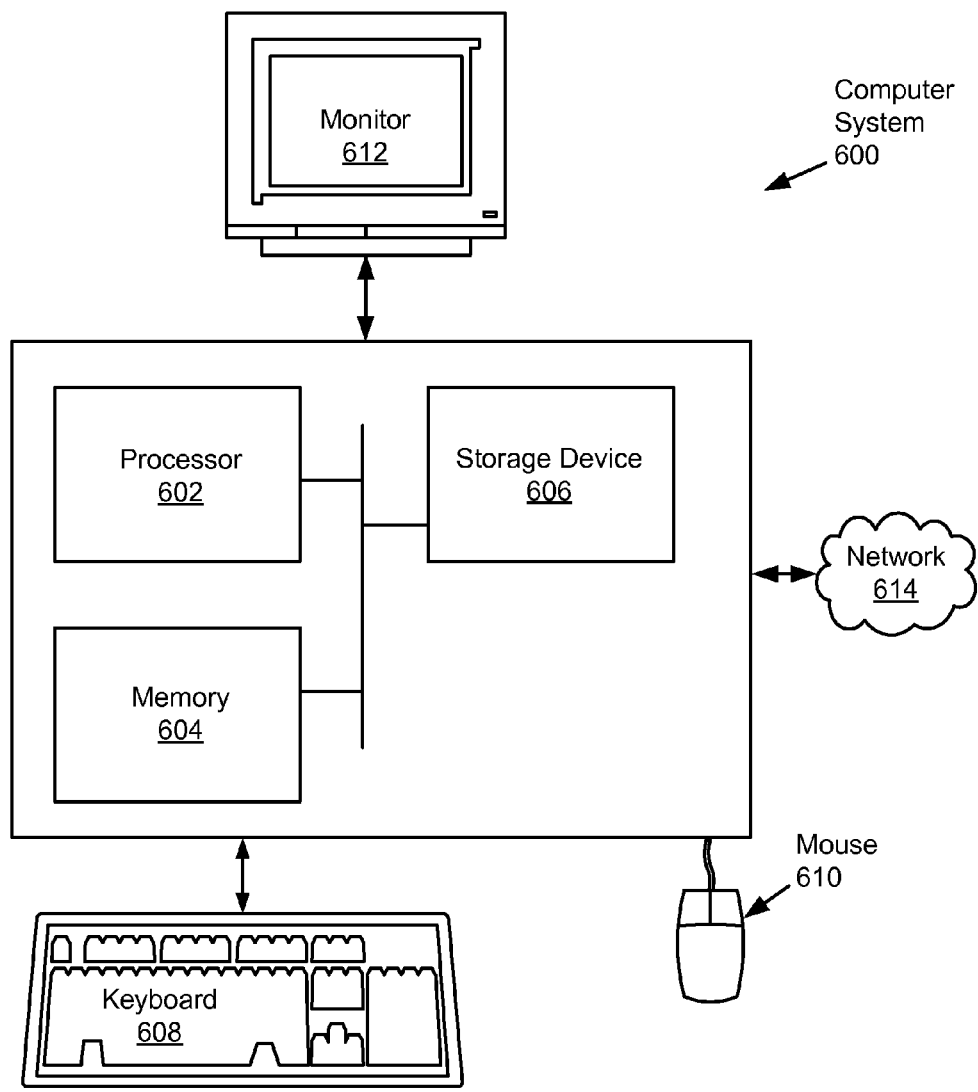
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602) such as an integrated circuit, central processing unit (CPU), or other hardware processor, associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., Social Contribution Engine, Validation Engine, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a non-transitory computer readable storage medium such as a compact disc (CD), volatile and non-volatile memory, a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying fixed asset transactions in a plurality of financial transactions, comprising:
   obtaining a plurality of financial transaction records describing the plurality of financial transactions; and
   generating, by a computer processor, an unverified fixed asset transaction list of depreciable property by, for each financial transaction record of the plurality of financial transaction records:
      determining whether the financial transaction record conforms to at least one asset identification rule of a plurality of asset identification rules, wherein the plurality of asset identification rules indicates which of the plurality of financial transactions are depreciable property, and wherein each of the plurality of asset identification rules corresponds to a confidence level of the asset identification rule, and
      when the financial transaction record conforms to the at least one asset identification rule:
         generating a confidence level of the financial transaction record based on the confidence level of the at least one asset identification rule, and
         inserting, as a fixed asset transaction, the financial transaction record and the confidence level of the financial transaction record in the unverified fixed asset transaction list.

2. The method of claim 1, further comprising:
generating an unverified fixed asset list from the unverified fixed asset transaction list, wherein the unverified fixed asset list comprises an entry for each fixed asset corresponding to the fixed asset transaction in the unverified fixed asset transaction list.

3. The method of claim 2, further comprising:
presenting the unverified fixed asset list to a user;
receiving, from the user, a plurality of selections in the unverified fixed asset list to accept a corresponding fixed asset; and
adding, for each of the plurality of selections, a corresponding entry to a verified fixed asset list.

4. The method of claim 3, further comprising:
generating a financial report comprising a depreciation expense for a current time period based on the verified fixed asset list.

5. The method of claim 2, further comprising:
receiving, from a user, a selection to accept an entry in the unverified fixed asset list; and
increasing the confidence level of the at least one asset identification rule based on the selection.

6. The method of claim 2, further comprising:
receiving, from a user, a selection to reject an entry in the unverified fixed asset list; and
decreasing the confidence level of the at least one asset identification rule based on the selection.

7. The method of claim 1, wherein the at least one asset identification rule comprises a plurality of matching asset identification rules, and wherein generating the confidence level of the financial transaction record comprises mathematically combining the confidence level of the plurality of matching asset identification rules.

8. The method of claim 1, wherein the plurality of asset identification rules comprises:
   a cost rule defining whether the financial transaction record describes the fixed asset transaction based on a cost identified in the financial transaction record, an account rule defining whether the financial transaction record describes the fixed asset transaction based on a financial account identified in the financial transaction record, a date rule defining whether the financial transaction record describes the fixed asset transaction based on a date identified in the financial transaction record, and a payee rule defining whether the financial transaction record describes the fixed asset transaction based on a payee identified in the financial transaction record.

9. The method of claim 1, wherein the plurality of asset identification rules comprises:

a time rule defining whether the financial transaction record describes the fixed asset transaction based on an elapsed time between a date in the financial transaction record and a current date.

10. The method of claim 1, wherein the plurality of asset identification rules comprises:

a memo rule defining whether the financial transaction record describes the fixed asset transaction based on a value of a memo field in the financial transaction record.

11. The method of claim 1, further comprising:

obtaining, from a plurality of users in a social network, a plurality of community defined rules; and adding the plurality of community defined rules to the plurality of asset identification rules.

12. The method of claim 1, further comprising:

receiving a user defined rule from a user; and adding the user defined rule to the plurality of asset identification rules.

13. A system for identifying fixed asset transactions in a plurality of financial transactions, comprising:

a computer processor;

a data repository comprising a plurality of financial transaction records describing the plurality of financial transactions; and a fixed asset application, executing on the computer processor, comprising:

a rules engine, wherein the rules engine, which when executed on the computer processor, is configured to generate an unverified fixed asset transaction list of depreciable property by, for each financial transaction record of the plurality of financial transaction records:

determining whether the financial transaction record conforms to at least one asset identification rule of a plurality of asset identification rules, wherein the plurality of asset identification rules indicates which of the plurality of financial transactions are depreciable property, and wherein each of the plurality of asset identification rules corresponds to a confidence level of the asset identification rule, and when the financial transaction record conforms to the at least one asset identification rule:

generating a confidence level for the financial transaction record based on the confidence level of the at least one asset identification rule, and inserting, as a fixed asset transaction, the financial transaction record and the confidence level of the financial transaction record in the unverified fixed asset transaction list.

14. The system of claim 13, wherein the fixed asset application further comprises:

an accounting system engine configured to generate an unverified fixed asset list from the unverified fixed asset transaction list, wherein the unverified fixed asset list comprises an entry for each fixed asset corresponding to the fixed asset transaction in the unverified fixed asset transaction list.

15. The system of claim 14, wherein the fixed asset application further comprises:

a user verification engine configured to:

present the unverified fixed asset list to a user, receive, from the user, a plurality of selections in the unverified fixed asset list to accept a corresponding fixed asset, and add, for each of the plurality of selections, a corresponding entry to a verified fixed asset list.

16. The system of claim 15, wherein the fixed asset application further comprises:

a report presentation engine configured to generate a financial report comprising a depreciation expense for a current time period based on the verified fixed asset list.

17. The system of claim 14, wherein the fixed asset application further comprises:

a user verification engine configured to:

receive, from a user, a selection to accept an entry in the unverified fixed asset list, and increase the confidence level of the at least one asset identification rule based on the selection.

18. The system of claim 14, wherein the fixed asset application further comprises:

a user verification engine configured to:

receive, from a user, a selection to reject an entry in the unverified fixed asset list, and decrease the confidence level of the at least one asset identification rule based on the selection.

19. The system of claim 13, wherein the data repository comprises the plurality of asset identification rules and wherein the plurality of asset identification rules comprises:

a cost rule defining whether the financial transaction record describes the fixed asset transaction based on a cost identified in the financial transaction record, an account rule defining whether the financial transaction record describes the fixed asset transaction based on a financial account identified in the financial transaction record, a date rule defining whether the financial transaction record describes the fixed asset transaction based on a date identified in the financial transaction record, and a payee rule defining whether the financial transaction record describes the fixed asset transaction based on a payee identified in the financial transaction record.

20. The system of claim 13, wherein the data repository comprises the plurality of asset identification rules, and wherein the plurality of asset identification rules comprises a time rule defining whether the financial transaction record describes the fixed asset transaction based on an elapsed time between a date in the financial transaction record and a current date.

21. A non-transitory computer readable storage device comprising computer readable program code embodied therein for performing a method for identifying fixed asset transactions in a plurality of financial transactions, the method comprising:

obtaining a plurality of financial transaction records describing the plurality of financial transactions; and generating, using a computer processor, an unverified fixed asset transaction list of depreciable property by, for each financial transaction record of the plurality of financial transaction records:

determining whether the financial transaction record conforms to at least one asset identification rule of a plurality of asset identification rules, wherein the plurality of asset identification rules indicates which of the plurality of financial transactions are depreciable property, and wherein each of the plurality of asset identification rules corresponds to a confidence level of the asset identification rule, and when the financial transaction record conforms to the at least one asset identification rule:
generating a confidence level of the financial transaction record based on the confidence level of the at least one asset identification rule, and
inserting, as a fixed asset transaction, the financial transaction record and the confidence level of the financial transaction record in the unverified fixed asset transaction list.

22. The non-transitory computer readable storage device of claim 21, wherein the method further comprises:
generating an unverified fixed asset list from the unverified fixed asset transaction list, wherein the unverified fixed asset list comprises an entry for each fixed asset corresponding to the fixed asset transaction in the unverified fixed asset transaction list.

23. The non-transitory computer readable storage device of claim 22, wherein the method further comprises:
presenting the unverified fixed asset list to a user,
receiving, from the user, a plurality of selections in the unverified fixed asset list to accept the corresponding fixed asset, and
adding, for each of the plurality of selections, a corresponding entry to a verified fixed asset list.

24. The non-transitory computer readable storage device of claim 23, wherein the method further comprises generating a financial report comprising a depreciation expense for a current time period based on the verified fixed asset list.

25. The non-transitory computer readable storage device of claim 22, wherein the method further comprises:
receiving, from a user, a selection to accept an entry in the unverified fixed asset list, and
increasing the confidence level of the at least one asset identification rule based on the selection.

26. The non-transitory computer readable storage device of claim 22, wherein the method further comprises:
receiving, from a user, a selection to reject an entry in the unverified fixed asset list, and
decreasing the confidence level of the at least one asset identification rule based on the selection.

27. The non-transitory computer readable storage device of claim 21, wherein the plurality of asset identification rules comprises a memo rule defining whether the financial transaction record describes the fixed asset transaction based on a value of a memo field in the financial transaction record.

28. The non-transitory computer readable storage device of claim 21, wherein the method further comprises:
obtaining, from a plurality of users in a social network, a plurality of community defined rules, and
adding the plurality of community defined rules to the plurality of asset identification rules.

29. The non-transitory computer readable storage device of claim 21, wherein the method further comprises:
receiving a user defined rule from a user, and
adding the user defined rule to the plurality of asset identification rules.

* * * * *